United States Patent
Zhang et al.

(10) Patent No.: US 11,847,169 B2
(45) Date of Patent: Dec. 19, 2023

(54) METHOD FOR DATA PROCESSING AND INTERACTIVE INFORMATION EXCHANGE WITH FEATURE DATA EXTRACTION AND BIDIRECTIONAL VALUE EVALUATION FOR TECHNOLOGY TRANSFER AND COMPUTER USED THEREIN

(71) Applicant: Shanghai Henghui Intellectual Property Service Co., Ltd., Shanghai (CN)

(72) Inventors: Ningzhan Zhang, Shanghai (CN); Xianfan Nie, Shanghai (CN); Xianjia Nie, Shanghai (CN); Changyun Chi, Shanghai (CN); Zechun Zhang, Shanghai (CN)

(73) Assignee: Shanghai Henghui Intellectual Property Service Co., Ltd., Shanghai (CN)

( * ) Notice: Subject to any disclaimer, the term of this patent is extended or adjusted under 35 U.S.C. 154(b) by 0 days.

(21) Appl. No.: 17/505,546

(22) Filed: Oct. 19, 2021

(65) Prior Publication Data

US 2022/0197955 A1  Jun. 23, 2022

Related U.S. Application Data

(63) Continuation of application No. PCT/CN2021/119314, filed on Sep. 18, 2021.

(30) Foreign Application Priority Data

Dec. 18, 2020 (CN) .......................... 202011506614.9

(51) Int. Cl.
*G06F 16/903* (2019.01)
*G06F 16/906* (2019.01)
(Continued)

(52) U.S. Cl.
CPC ...... *G06F 16/90344* (2019.01); *G06F 16/906* (2019.01); *G06F 16/908* (2019.01); *G06F 16/9035* (2019.01); *G06Q 50/184* (2013.01)

(58) Field of Classification Search
CPC ............. G06F 16/90344; G06F 16/906; G06F 16/9035; G06F 16/908; G06Q 50/184
(Continued)

(56) References Cited

U.S. PATENT DOCUMENTS 5,991,751 A * 11/1999 Rivette ................. G06F 16/382
707/E17.093
6,289,341 B1 * 9/2001 Barney ................. G06F 16/951
707/706
(Continued)

FOREIGN PATENT DOCUMENTS

CN  107194568 A  9/2017
CN  108280781 A  7/2018
(Continued)

OTHER PUBLICATIONS

Trappey et al., "A patent quality analysis for innovative technology and product development", 2011, Elsevier, 9 pages printed (Year: 2011).*
(Continued)

*Primary Examiner* — Alex Gofman
*Assistant Examiner* — Michael Le
(74) *Attorney, Agent, or Firm* — MEI & MARK LLP; Manni Li (57) ABSTRACT

A method for data processing and interactive information exchange with feature data extraction and bidirectional value evaluation for technology transfer is provided. During the process, a data processing instruction is formed after receiving a user operation instruction, and the corresponding data is obtained in accordance with the data processing
(Continued)

instruction. Then, the corresponding data is processed to obtain specified data with feature data extraction; and the corresponding task for the specified data is being run to obtain a corresponding processing result, including a bidirectional value evaluation between the user and the processing result. A computer is also provided for use in connection with the method, where patent information is collected from the patent literature and subjected to processing, sorting, and analysis.

5 Claims, 5 Drawing Sheets

(51) Int. Cl.
  *G06F 16/9035* (2019.01)
  *G06F 16/908* (2019.01)
  *G06Q 50/18* (2012.01)

(58) Field of Classification Search
  USPC .......................................................... 707/769
  See application file for complete search history.

(56) References Cited

U.S. PATENT DOCUMENTS

| | | | | |
|---|---|---|---|---|
| 6,556,992 | B1* | 4/2003 | Barney | G06Q 10/10 |
| 6,604,114 | B1* | 8/2003 | Toong | G06F 16/904 |
| 7,117,443 | B1* | 10/2006 | Zilka | G06Q 50/184 |
| | | | | 715/739 |
| 7,606,757 | B1* | 10/2009 | Poltorak | G06Q 40/06 |
| | | | | 705/36 R |
| 7,676,375 | B1* | 3/2010 | Neifeld | G06Q 50/184 |
| | | | | 705/306 |
| 7,895,104 | B1* | 2/2011 | Lee | G06Q 40/00 |
| | | | | 705/30 |
| 7,966,328 | B2* | 6/2011 | Germeraad | G06Q 10/10 |
| | | | | 707/936 |
| 7,984,047 | B2* | 7/2011 | Sukman | G06F 16/93 |
| | | | | 707/E17.069 |
| 8,180,711 | B2* | 5/2012 | Malackowski | G06Q 40/04 |
| | | | | 705/53 |
| 8,620,800 | B1* | 12/2013 | Micaelian | G06Q 50/184 |
| | | | | 705/38 |
| 8,639,695 | B1* | 1/2014 | Spielthenner | G06F 16/285 |
| | | | | 707/737 |
| 9,454,731 | B1* | 9/2016 | Lee | G06N 3/049 |
| 10,133,791 | B1* | 11/2018 | Chan | G06N 20/20 |
| 10,157,352 | B1* | 12/2018 | Chan | G06F 16/22 |
| 10,380,147 | B1* | 8/2019 | Omland | G06F 16/30 |
| 10,891,701 | B2* | 1/2021 | Jessen | G06Q 10/10 |
| 11,048,709 | B2* | 6/2021 | Lundberg | G06F 16/93 |
| 11,200,378 | B2* | 12/2021 | Fleischman | G06F 40/247 |
| 11,461,862 | B2* | 10/2022 | Lundberg | G06Q 50/184 |
| 2002/0002524 | A1* | 1/2002 | Kossovsky | G06Q 40/00 |
| | | | | 705/37 |
| 2002/0004775 | A1* | 1/2002 | Kossovsky | G06Q 10/10 |
| | | | | 705/26.1 |
| 2002/0022974 | A1* | 2/2002 | Lindh | G06F 16/34 |
| | | | | 707/E17.093 |
| 2003/0036945 | A1* | 2/2003 | Del Vecchio | G06Q 10/10 |
| | | | | 705/310 |
| 2003/0212572 | A1* | 11/2003 | Poltorak | G06Q 40/02 |
| | | | | 705/310 |
| 2004/0015481 | A1* | 1/2004 | Zinda | G06F 16/30 |
| 2004/0181427 | A1* | 9/2004 | Stobbs | G06Q 50/184 |
| | | | | 705/310 |
| 2004/0186738 | A1* | 9/2004 | Reisman | G06Q 30/0601 |
| | | | | 705/26.1 |
| 2005/0144177 | A1* | 6/2005 | Hodes | G06F 40/237 |
| 2005/0149420 | A1* | 7/2005 | Hagelin | G06Q 30/08 |
| | | | | 705/35 |
| 2005/0210008 | A1* | 9/2005 | Tran | G06F 16/951 |
| 2005/0210009 | A1* | 9/2005 | Tran | H04L 63/08 |
| 2005/0234685 | A1* | 10/2005 | Tanigawa | G06Q 10/10 |
| | | | | 703/2 |
| 2005/0234738 | A1* | 10/2005 | Hodes | G06Q 99/00 |
| | | | | 705/310 |
| 2006/0036529 | A1* | 2/2006 | Williams | G06Q 10/00 |
| | | | | 715/275 |
| 2006/0106847 | A1* | 5/2006 | Eckardt, III | G06F 16/3323 |
| | | | | 707/E17.093 |
| 2006/0248055 | A1* | 11/2006 | Haslam | G06F 16/382 |
| 2006/0248094 | A1* | 11/2006 | Andrews | G06Q 10/00 |
| 2007/0061249 | A1* | 3/2007 | Newman | G06Q 40/04 |
| | | | | 705/37 |
| 2007/0073625 | A1* | 3/2007 | Shelton | G06Q 90/00 |
| | | | | 705/59 |
| 2007/0073748 | A1* | 3/2007 | Barney | G06F 16/95 |
| | | | | 707/E17.093 |
| 2007/0136116 | A1* | 6/2007 | Germeraad | G06Q 50/18 |
| | | | | 705/310 |
| 2007/0143322 | A1* | 6/2007 | Kothari | G06F 40/194 |
| 2007/0150298 | A1* | 6/2007 | Barney | G06Q 50/184 |
| | | | | 705/306 |
| 2007/0208669 | A1* | 9/2007 | Rivette | G06Q 50/184 |
| | | | | 705/310 |
| 2007/0219939 | A1* | 9/2007 | Van Luchene | G06Q 10/00 |
| 2007/0244837 | A1* | 10/2007 | Plow | G06Q 50/184 |
| | | | | 705/36 R |
| 2008/0010365 | A1* | 1/2008 | Schneider | H04L 63/10 |
| | | | | 709/223 |
| 2008/0281748 | A1* | 11/2008 | Newman | G06Q 30/08 |
| | | | | 705/37 |
| 2008/0301138 | A1* | 12/2008 | Hasan | G06Q 10/10 |
| 2009/0070150 | A1* | 3/2009 | Malackowski | G06Q 40/08 |
| | | | | 705/4 |
| 2009/0138466 | A1* | 5/2009 | Henry | G06F 16/40 |
| | | | | 707/999.005 |
| 2009/0259506 | A1* | 10/2009 | Barney | G06Q 10/10 |
| | | | | 705/35 |
| 2009/0307577 | A1* | 12/2009 | Lee | G06Q 50/26 |
| | | | | 707/E17.108 |
| 2010/0169127 | A1* | 7/2010 | Malackowski | G06Q 50/184 |
| | | | | 705/306 |
| 2010/0262512 | A1* | 10/2010 | Lee | G06Q 30/0601 |
| | | | | 715/764 |
| 2010/0306244 | A1* | 12/2010 | Guo | G06F 16/93 |
| | | | | 707/769 |
| 2011/0082862 | A1* | 4/2011 | Walsh | G06F 16/20 |
| | | | | 707/E17.089 |
| 2011/0246379 | A1* | 10/2011 | Maddox | G06Q 50/18 |
| | | | | 715/764 |
| 2011/0270826 | A1* | 11/2011 | Cha | G06F 16/93 |
| | | | | 707/723 |
| 2012/0191757 | A1* | 7/2012 | Gross | G06Q 10/0633 |
| | | | | 707/E17.032 |
| 2012/0278244 | A1* | 11/2012 | Lee | G06Q 50/184 |
| | | | | 705/310 |
| 2013/0282598 | A1* | 10/2013 | Ma | G06Q 10/00 |
| | | | | 705/310 |
| 2013/0282599 | A1* | 10/2013 | Kang | G06Q 10/10 |
| | | | | 705/310 |
| 2013/0311562 | A1* | 11/2013 | Platt | C09K 11/06 |
| | | | | 709/204 |
| 2014/0052667 | A1* | 2/2014 | Lundberg | G06Q 10/06 |
| | | | | 705/36 R |
| 2014/0075004 | A1* | 3/2014 | Van Dusen | H04L 41/04 |
| | | | | 709/223 |
| 2014/0108273 | A1* | 4/2014 | Lundberg | G06Q 40/06 |
| | | | | 705/310 |
| 2014/0110901 | A1* | 4/2014 | Witchey | A63F 3/00138 |
| | | | | 273/297 |
| 2014/0156544 | A1* | 6/2014 | Sabattini | G06Q 50/184 |
| | | | | 705/310 |
| 2014/0222694 | A1* | 8/2014 | Chen | G06Q 10/10 |
| | | | | 705/310 |
| 2014/0258143 | A1* | 9/2014 | Laroche | G06Q 50/184 |
| | | | | 705/310 |

(56) References Cited

U.S. PATENT DOCUMENTS

| | | | | |
|---|---|---|---|---|
| 2014/0258153 | A1* | 9/2014 | Lundberg | G06Q 50/184 705/310 |
| 2014/0279690 | A1* | 9/2014 | Mohanty | G06Q 40/06 705/36 R |
| 2014/0317000 | A1* | 10/2014 | Lundberg | G06Q 10/06 705/310 |
| 2014/0317001 | A1* | 10/2014 | Elias | G06Q 10/10 705/310 |
| 2014/0365386 | A1* | 12/2014 | Carstens | G06Q 10/10 705/310 |
| 2015/0178272 | A1* | 6/2015 | Geigel | G06F 40/30 704/9 |
| 2015/0187033 | A1* | 7/2015 | Sukman | G06F 40/169 705/310 |
| 2015/0193896 | A1* | 7/2015 | Skaist | G06Q 50/184 705/310 |
| 2015/0269693 | A1* | 9/2015 | Geigel | G06Q 50/184 705/310 |
| 2015/0310115 | A1* | 10/2015 | Ryger | G06F 16/93 707/708 |
| 2016/0019231 | A1* | 1/2016 | Twito | G06F 16/148 707/722 |
| 2016/0155161 | A1* | 6/2016 | Reisman | G06Q 30/0601 705/26.1 |
| 2016/0170814 | A1* | 6/2016 | Li | G06F 9/542 719/318 |
| 2016/0232246 | A1* | 8/2016 | Rau | G06Q 50/184 |
| 2016/0350886 | A1* | 12/2016 | Jessen | G06Q 50/184 |
| 2017/0046398 | A1* | 2/2017 | Beretich, Jr. | G06F 16/24575 |
| 2017/0132731 | A1* | 5/2017 | Morimoto | G06F 16/951 |
| 2017/0358045 | A1* | 12/2017 | Takeda | G06Q 50/18 |
| 2018/0018564 | A1* | 1/2018 | Erenrich | G06F 16/3334 |
| 2018/0247078 | A1* | 8/2018 | Newman | G06F 16/93 |
| 2019/0066219 | A1* | 2/2019 | Ouderkirk | G06Q 10/06398 |
| 2019/0220938 | A1* | 7/2019 | Sukman | G06Q 50/184 |
| 2019/0259114 | A1* | 8/2019 | Spangenberg | G06F 16/24578 |
| 2019/0303540 | A1* | 10/2019 | Shirasaka | G06F 21/10 |
| 2019/0391976 | A1* | 12/2019 | Tsai | G06F 16/2465 |
| 2020/0184585 | A1* | 6/2020 | Shirasaka | G06Q 50/184 |
| 2020/0219215 | A1* | 7/2020 | Ai | G06Q 30/0206 |
| 2020/0349204 | A1* | 11/2020 | Shirasaka | G06F 40/205 |
| 2021/0117669 | A1* | 4/2021 | Baijal | G06F 18/214 |
| 2022/0114685 | A1* | 4/2022 | Kwak | G06N 3/04 |
| 2022/0147583 | A1* | 5/2022 | Spangenberg | G06F 16/953 |

FOREIGN PATENT DOCUMENTS

| | | | | |
|---|---|---|---|---|
| JP | 6506489 | B1 * | 4/2019 | G06F 16/245 |
| KR | 101118057 | * | 2/2012 | G06Q 50/184 |

OTHER PUBLICATIONS

Abbas et al., "A literature review on the state of the art in patent analysis", 2013, Elsevier, 11 pages printed. (Year: 2013).*

Huang, Ying, "Research on tracing technological evolution pathways based on patent documents," dissertation, Beijing Institute of Technology, School of Management & Economics (Jun. 4, 2018), abstract only.

* cited by examiner

METHOD FOR DATA PROCESSING AND INTERACTIVE INFORMATION EXCHANGE WITH FEATURE DATA EXTRACTION AND BIDIRECTIONAL VALUE EVALUATION FOR TECHNOLOGY TRANSFER AND COMPUTER USED THEREIN

CROSS-REFERENCE TO RELATED APPLICATIONS

The subject application is a continuation of PCT/CN2021/119314 filed on Sep. 18, 2021, which claims priority on Chinese Application No. 202011506614.9 filed on Dec. 18, 2020 in China. The contents and subject matter of the PCT international application and Chinese priority application are incorporated herein by reference.

TECHNICAL FIELD

The present invention relates to computers and network communication, particularly, a general information interaction method for a technology transfer office, and terminal and medium used therein.

BACKGROUND ART

Promoting transfer and transformation of scientific and technological achievements, as an important task for implementing the innovation-driven development strategy, is a key link to strength the close integration of science and technology and the economy and play an important role in economic mode and structure adjustment of scientific and technological innovation. However, due to lack of highly specialized professionals engaged in technology transfer work that can achieve marketization and industrialization of research achievements through an effective way, the technology transfer completions are not optimized. The innovative value of the scientific research achievements can be realized only by completing scientific research and experimental development as well as application and popularization.

The operation of the technology transfer office becomes an important support for the transfer and transformation of the scientific and technological achievements, and new technologies can be transferred to the business world through the technology transfer office. The technology transfer office is built to provide professional services for the transfer and transformation of the scientific and technological achievements, which not only enables researchers to concentrate on scientific research, but also improves the achievement transformation efficiency and avoids investment risks. More importantly, as a bridge for connecting government, school, and enterprise, the technology transfer office has opened up a channel for combining science and technology with economy, and provided a 'leap-forward' development strategy approach for implementing the overall independent innovation strategy.

Searching results show that Chinese invention patent application CN108280781A entitled "Business Operation Method of Technology Transfer and Transformation based on Big Data" published on Jul. 13, 2018 discloses a method having the steps of establishing a big data platform, obtaining a technology ontology and a technology receptor, and connecting the technology ontology with the technology receptor through the big data platform, and completing technology transfer or transformation. The method lacks a practical and effective data mining tool, and the final result is not optimized; and the method does not provide comprehensive capabilities and cannot deliver the effective interaction of general information and meet the working requirements of the technical patent office.

In conclusion, a multifunctional, multi-dimensional, integrated and stable-performance general information interaction technology of a technology transfer office that meets the scientific and technological achievement transfer and transformation characteristics is urgently needed in the field. No description or report of a technology similar to the present invention has been found so far, and similar data has not yet been collected in China and abroad.

SUMMARY OF THE PRESENT INVENTION

The present invention provides a general information interaction method of a technology transfer office, a terminal and a medium used therein to solve the problem of the current technology.

The present invention provides a general information interaction method for a technology transfer office that comprises the steps of: forming a data processing instruction according to a user operation instruction and calling corresponding information data related to technology transfer; performing data processing on the information data to obtain required specified data; and running a corresponding processing task for the specified data, obtaining a corresponding processing result, and completing interactive docking between a user and the processing result.

Preferably, the information data related to the technology transfer comprises patent literature and other technology literature; patent metadata and other intellectual property information data; patent legal status data; project transformation information data; scientific and technological achievement information data; expert information data; expert scientific and technological achievement data; technical manager information data; related enterprise information data; and other information data set according to requirements.

Preferably, the data processing instruction includes: a patent information analysis instruction: used for obtaining the patent information in the patent literature to form patent competition information; a trend analysis instruction: used for obtaining patent number, patent litigation number and patent transaction number in different technical fields within a set time period so as to form patent trend information, and then discovering a new field worthy of entering; a citation analysis instruction: used for generating a citation analysis map of the technology and obtaining a technology source and key nodes in a development process; a regional analysis instruction: used for obtaining patent distribution conditions of different regions so as to verify the possibility of entering a potential market; a technology analysis instruction: used for obtaining current technology distribution conditions in an industry and displaying the technical field of competitors so as to provide reference for research and development; a litigation risk analysis instruction: used for extracting patents in the industry and corresponding legal information and establishing an early warning mechanism; an intellectual property value evaluation instruction used for obtaining intellectual property values by utilizing current intellectual property production value and future effects; a bidirectional value evaluation instruction between users and information data: used for carrying out bidirectional scoring on the users and the technology based on the cooperation relation between the users and the technology and the association relation between the users; a technology innovation evaluation instruction: used for obtaining related technical information in the existing technology literature based on technology keywords and carrying out preliminary innovation evaluation on the technology; and a data query instruction: used for obtaining information data required by the user according to a user search request.

Preferably, the step of performing data processing on information data to obtain required specified data comprises obtaining feature data in the information data; performing feature extraction on the feature data; and filtering the extracted features to obtain specified data.

Preferably, a feature data extraction method based on a time sequence for obtaining the feature data in the information data comprises extracting preliminary feature data from the information data by adopting a feature extraction method; identifying a time sequence of the state quantity of each preliminary feature data by utilizing a time sequence model; classifying the preliminary feature data in the time sequence, obtaining a density value near each preliminary feature data sample by adopting a density clustering method, and giving a sample aggregation area; and introducing a label motion speed into the sample aggregation area, so that a sliding window of the sample aggregation area is adaptively adjusted to complete optimal extraction of the preliminary feature data to obtain final feature data.

Preferably, a fuzzy hierarchical clustering analysis and semantic similarity correlation based feature extraction method for performing feature extraction on the feature data comprises performing data integration of a distributed data ontology on the obtained feature data; performing semantic similarity and correlation judgment on the integrated feature data, and extracting semantic correlation features of the feature data information flow; and performing clustering analysis on the extracted semantic correlation features, performing information fusion of the semantic correlation features, and solving an optimal solution of a feature extraction objective function so as to realize feature extraction.

Preferably, a character string fuzzy matching method based on a filtering technology is adopted for filtering the extracted features and comprises obtaining a to-be-matched target character string from the extracted features to form a character string set; filtering the character string set by utilizing a regular expression; and performing fuzzy matching on the filtered character string set by adopting a parallel processing method to obtain specified data.

Preferably, the established patent network model is adopted for running the corresponding processing task for the specified data and obtaining the corresponding processing result, wherein the patent network model comprises a patent citation network model which generates the citation analysis map of the technology based on the patent citation relationship and obtains the technology source and the key nodes in the development process; an IPC co-occurrence network model which performs statistics on information in a patent association network based on a patent IPC classification co-occurrence relationship and then obtains trend analysis, regional analysis, technology analysis and/or litigation risk analysis results; a keyword network model which obtains patent information in patent literature based on an SAO text mining method and forms patent competition information; a patent value evaluation model which establishes a corresponding relationship between current intellectual property production value and future effects based on a deep learning method and then obtains corresponding value evaluation; a bidirectional value evaluation model which constructs a user-technology interaction binary network model and a user association network model by utilizing historical interaction behaviors between users and information data, wherein the cooperation relationship between the users and the information data is obtained based on the user-technology interaction binary network model; the association relationship between the users is obtained based on the user association network model; and the users and the information data are scored based on the cooperation relationship and the association relationship so as to obtain bidirectional value evaluation of the users and the information data; a technology innovation evaluation model which obtains technology information in the technology literature based on a character recognition method, compares the technology information with to-be-evaluated technology keywords and gives corresponding innovation evaluation according to the comparison result; and a data query model which directly queries required information data based on a data search engine.

Preferably, the process of running the corresponding processing task for the specified data and obtaining the corresponding processing result further comprises arranging the obtained corresponding processing result into an index.

Preferably, the bidirectional value evaluation model performs user community detection and information data collaborative filtering according to the cooperation relationship and the association relationship and calls corresponding information data on the basis.

Preferably, the technology innovation evaluation model adopts the character recognition method to carry out picture recognition on the technology literature in the related technical field to obtain recognized characters, performs character clustering on the recognized characters to obtain pictures to be used for comparison, compares the to-be-evaluated technology keywords with characters in the picture to be used for comparison, and judges that the technology innovation is insufficient if the same rate of the to-be-evaluated technology keywords and the characters in the picture to be used for comparison is greater than a judgment threshold value.

Preferably, the method further comprises updating corresponding information data related to technology transfer according to the user operation instruction.

The present invention further provides a terminal that comprises a memory, a processor, and a computer program which is stored in the memory and can be run on the processor, wherein the processor can be used for executing any one of the methods when executing the program.

Preferably, the information data are stored in a local memory or a cloud.

The present invention further provides a computer readable storage medium, wherein the computer program is stored in the computer readable storage medium, and the program can be used for executing any one of the methods when being executed by the processor.

Due to the adoption of the technical scheme, the method has at least one of the following beneficial effects over the current technology:

1. The general information interaction method and system of the technology transfer office and the terminal provided by the present invention collect patent information from patent literature, and perform processing, sorting and analysis to form patent competition information so as to serve scientific and technological development strategies of enterprises.

2. The general information interaction method and system of the technology transfer office and the terminal provided by the present invention, taking isolated information according to different aggregation degrees, transform common information into valuable patent competition information through patent information analysis transform, and can assess key technologies and technology development directions of enterprises or countries in related industries and technical fields, and technology combinations and technology investment trends of main competitors from a special perspective of patents according to the information, thereby formulating patent strategies matched with overall development strategies for the enterprises.

3. The general information interaction method and system of the technology transfer office and the terminal provided by the present invention perform intellectual property value evaluation through current intellectual property production value and future effects, so that the result is more accurate.

4. The general information system of the technology transfer office provided by the present invention enables the users to effectively know risks existing in the technology transfer process through bidirectional evaluation on the users and technologies and can complete business opportunity recommendation.

5. The general information system of the technology transfer office provided by the present invention can estimate the value prospect of related technologies in advance through innovation evaluation on the technologies.

6. The general information interaction method and system of the technology transfer office and the terminal provided by the present invention simultaneously realize the functions of patent information analysis, trend analysis, citation analysis, regional analysis, technology analysis, litigation analysis, value analysis, credit evaluation, innovation evaluation and the like of the patent technology, and provide an effective reference basis for the possibility of entering the potential market and new fields.

7. The general information interaction method and system of the technology transfer office, and the terminal provided by the present invention improve the recall ratio and precision ratio of data mining through a simple and effective data mining method and a data processing model, and the performance is stable and reliable.

8. The general information interaction method and system of the technology transfer office, and the terminal provided by the present invention are an objective and scientifically verified model and can effectively evaluate the technical combination and identify technicians with successful commercialization potential.

9. The general information interaction method and system of the technology transfer office, and the terminal provided by the present invention realize retrieval, viewing, evaluation and batch analysis of patents by patent analysis users, and also realize patent directional recommendation of the patent analysis users, global regular calculation and updating of patent data and continuous extraction and analysis of related data of the patent users and the patents.

10. By adopting the general information interaction method and system of the technology transfer office, and the terminal provided by the present invention, practical and effective reference values can be provided for methods for improving the commercialization success rate, objectively evaluating and shunting corresponding technologies, efficiently investing related patents, researching, developing and marketing, avoiding high-cost investment of bad technical assets, identifying and preventing unpredictable problems of risks exposed in the commercialization process and the like.

BRIEF DESCRIPTION OF THE DRAWINGS

By reading and referring to the detailed description of non-limiting embodiments in the following attached drawings, other characteristics, purposes and advantages of the present invention are more obvious.

DETAILED DESCRIPTION OF THE PRESENT INVENTION

The embodiments of the present invention are described in detail below: these embodiments are implemented on the premise of the technical scheme of the present invention, and detailed implementation manners and specific operation processes are given. It should be pointed out that for those of ordinary skill in the art, without departing from the concept of the present invention, several modifications and improvements can be made, and these all fall within the protection scope of the present invention.

Figure 1:
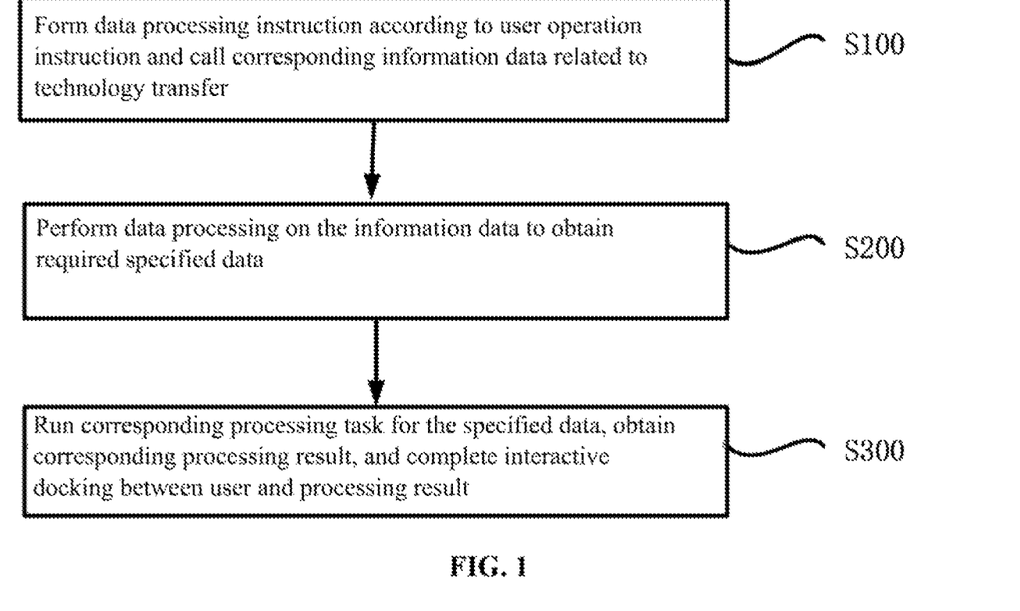
FIG. 1 shows the workflow of the general information interaction method of a technology transfer office in one embodiment of the present invention.

As shown in FIG. 1, the workflow of the office general information interaction method of the technology transfer in one embodiment of the present invention comprises the following steps:

S100, forming a data processing instruction according to a user operation instruction, and calling corresponding information data related to technology transfer;

S200, performing data processing on the information data to obtain required specified data; and S300, running a corresponding processing task for the specified data, obtaining a corresponding processing result, and completing interactive docking between a user and the processing result.

In the embodiment, preferably, the information data related to technology transfer can include any one or more of the following:

patent literature and other technology literature;
patent metadata and other intellectual property information data;
patent legal status data;
project transformation information data;
scientific and technological achievement information data;
expert information data;
expert scientific and technological achievement data;
technology manager information data;
related enterprise information data; and
other information data set according to requirements.

In the embodiment, preferably, the data processing instruction can include any one or more of the following:

a patent information analysis instruction for obtaining patent information in the patent literature to form patent competition information;
a trend analysis instruction for obtaining the patent number, the patent litigation number and the patent transaction number in different technical fields within a set time period so as to form patent trend information, and then discovering a new field worthy of entering;

a citation analysis instruction for generating a citation analysis map of the technology and obtaining a technology source and key nodes in a development process;

a regional analysis instruction for obtaining patent distribution conditions of different regions so as to verify the possibility of entering the potential market;

a technology analysis instruction for obtaining current technology distribution conditions in the industry and displaying the technical field of competitors so as to provide reference for research and development;

a litigation risk analysis instruction for extracting patents in the industry and corresponding legal information and establishing an early warning mechanism;

an intellectual property value evaluation instruction for obtaining intellectual property values by utilizing current intellectual property production value and future effects;

a bidirectional value evaluation instruction between users and information data for carrying out bidirectional scoring on the users and the technologies based on the cooperation relation between the users and the technologies and the association relation between the users;

a technology innovation evaluation instruction for obtaining related technical information in the existing technology literature based on technology keywords and carrying out preliminary innovation evaluation on the technology; and a data query instruction for obtaining information data required by the user according to a user search request.

Figure 2:
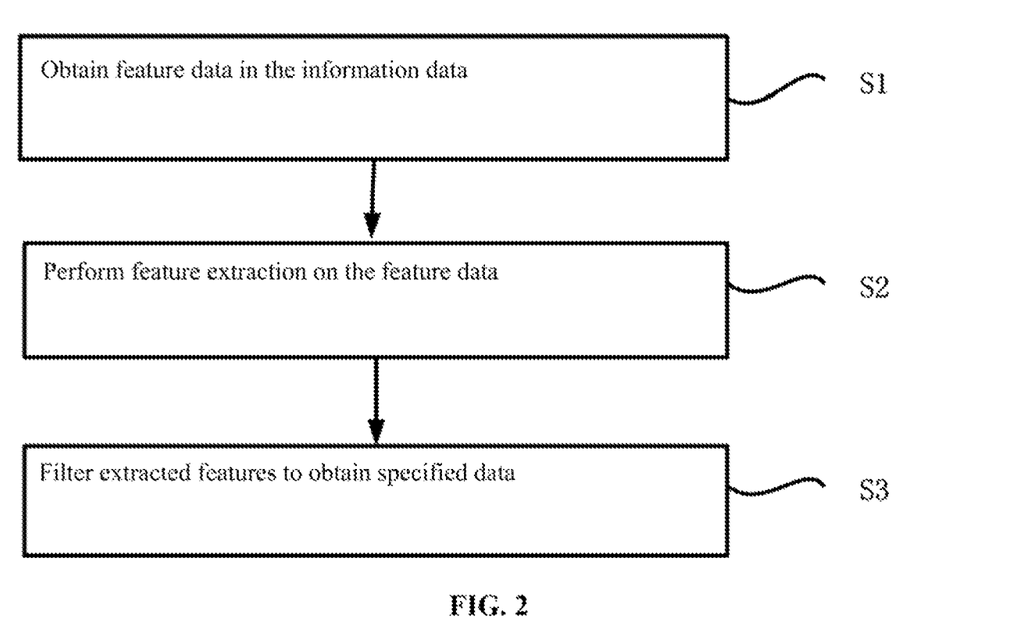
FIG. 2 shows the workflow for obtaining specified data in one preferred embodiment of the present invention.

In the embodiment as shown in FIG. 2, preferably, the step of performing data processing on information data to obtain required specified data comprises the following steps:

S1, obtaining feature data in the information data;

S2, performing feature extraction on the feature data; and

S3, filtering the extracted features to obtain specified data.

Figure 3:
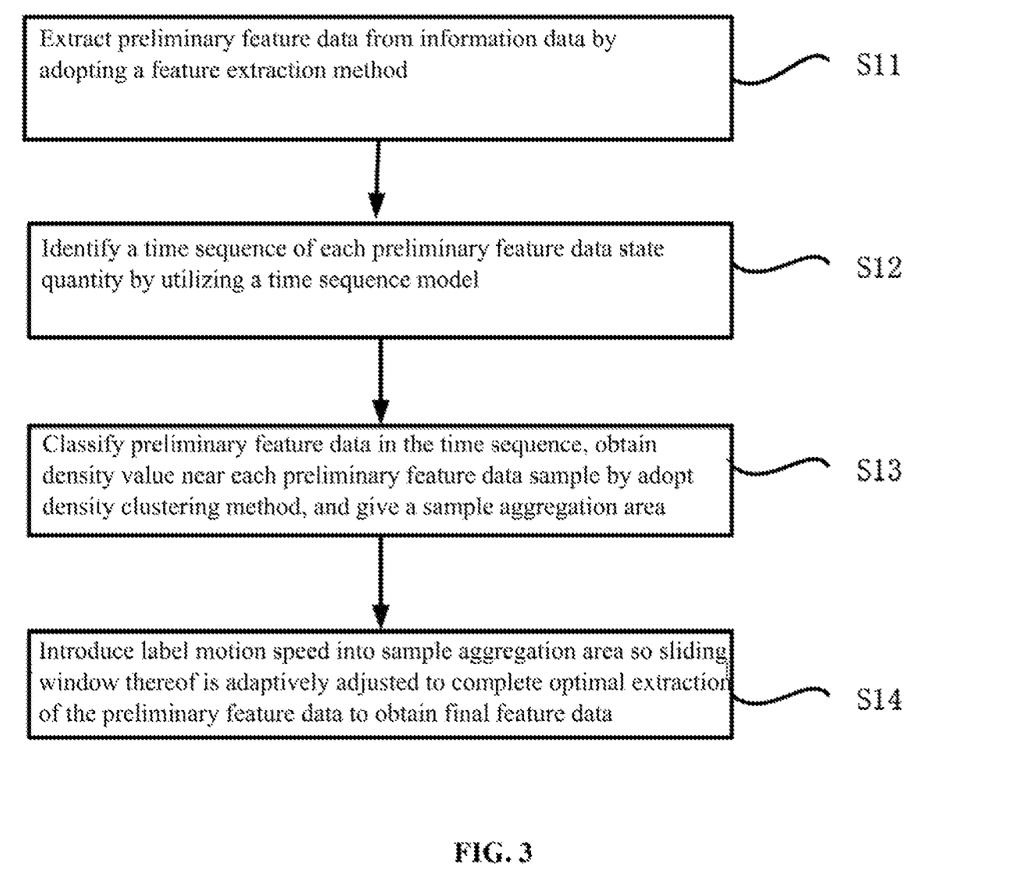
FIG. 3 shows the workflow for obtaining feature data in one preferred embodiment of the present invention.

In the embodiment as shown in FIG. 3, preferably, a feature data extraction method based on a time sequence is adopted for obtaining the feature data in the information data in S1 and comprises the following steps:

S11, extracting preliminary feature data from the information data by adopting a feature extraction method;

S12, identifying a time sequence of the state quantity of each preliminary feature data by utilizing a time sequence model;

S13, classifying the preliminary feature data in the time sequence, obtaining a density value near each preliminary feature data sample by adopting a density clustering method, and giving a sample aggregation area; and S14, introducing a label motion speed into the sample aggregation area, so that a sliding window of the sample aggregation area is adaptively adjusted to complete optimal extraction of the preliminary feature data to obtain final feature data.

Figure 4:
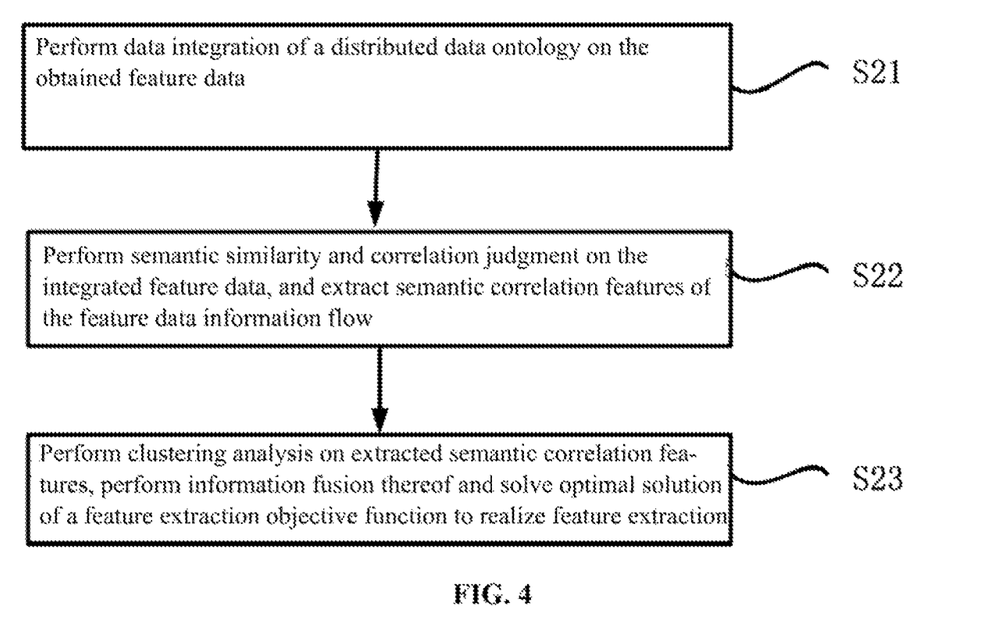
FIG. 4 shows the workflow for performing feature extraction on the feature data in one preferred embodiment of the present invention.

In the embodiment as shown in FIG. 4, preferably, a fuzzy hierarchical clustering analysis and semantic similarity correlation based feature extraction method is adopted for performing feature extraction on the feature data in S2 and comprises the following steps:

S21, performing data integration of a distributed data ontology on the obtained feature data;

S22, performing semantic similarity and correlation judgment on the integrated feature data, and extracting semantic correlation features of the feature data information flow; and S23, performing clustering analysis on the extracted semantic correlation features, performing information fusion of the semantic correlation features, and solving an optimal solution of a feature extraction objective function so as to realize feature extraction.

Figure 5:
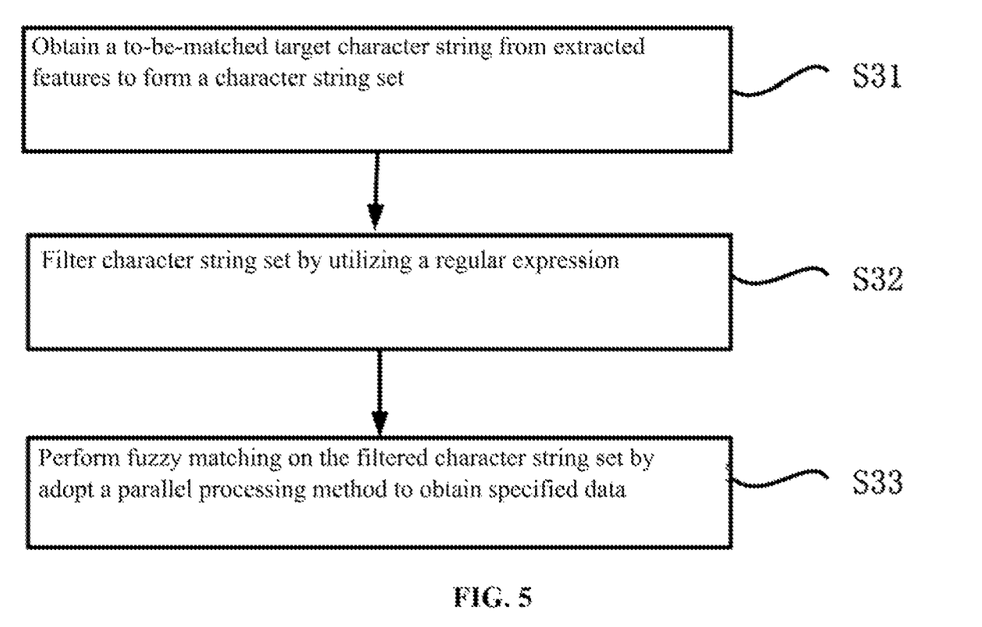
FIG. 5 shows the workflow for obtaining specified data in one preferred embodiment of the present invention.

In the embodiment as shown in FIG. 5, preferably, a character string fuzzy matching method based on a filtering technology is adopted for filtering the extracted features in S3 and comprises the following steps:

S31, obtaining a to-be-matched target character string from the extracted features to form a character string set;

S32, filtering the character string set by utilizing a regular expression; and

S33, performing fuzzy matching on the filtered character string set by adopting a parallel processing method to obtain specified data.

Figure 6:
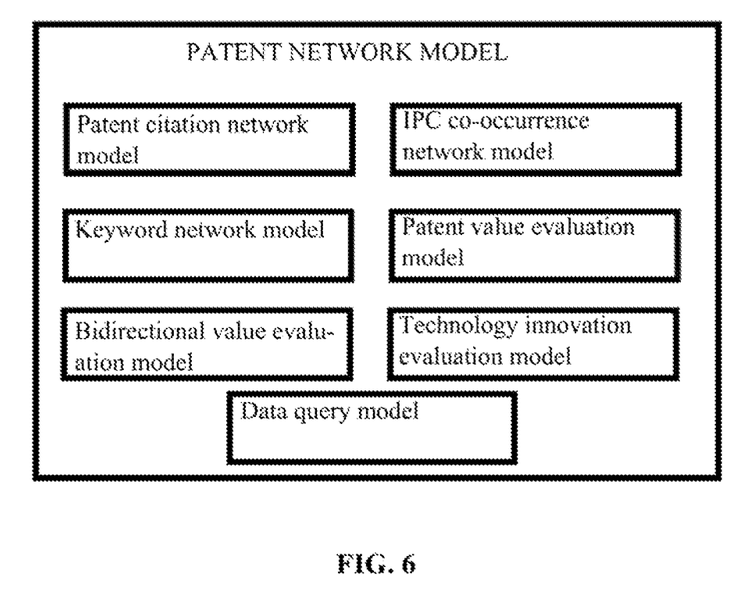
FIG. 6 shows the patent network model in one preferred embodiment of the present invention.

In the embodiment, preferably, the established patent network model (a model generally refers to a database in the present invention unless specifically defined otherwise) is adopted for running the corresponding processing task for the specified data and obtaining the corresponding processing result, wherein the patent network model, as shown in FIG. 6, comprises one or more of the following:

a patent citation network model which generates a citation analysis map of a technology based on a patent citation relationship and obtains a technology source and key nodes in a development process;

an IPC co-occurrence network model which performs statistics on information in a patent association network based on a patent IPC classification co-occurrence relationship and then obtains trend analysis, regional analysis, technology analysis and/or litigation risk analysis results;

a keyword network model which obtains patent information in patent literature based on an SAO text mining method and forms patent competition information;

a patent value evaluation model which establishes a corresponding relationship between current patent production value and future effects based on a deep learning method and then obtains corresponding value evaluation;

a bidirectional value evaluation model which constructs a user-technology interaction binary network model and a user association network model by utilizing historical interaction behaviors between users and information data, wherein a cooperation relationship between the users and the information data is obtained based on the user-technology interaction binary network model;

an association relationship between the users is obtained based on the user association network model;

the users and the information data are scored based on the cooperation relationship and the association relationship so as to obtain bidirectional value evaluation of the users and the information data;

a technology innovation evaluation model which obtains technology information in the technology literature based on a character recognition method, compares the technology information with to-be-evaluated technology keywords and gives corresponding innovation evaluation according to the comparison result; and a data query model which directly queries required information data based on a data search engine.

In the embodiment, preferably, the process of running the corresponding processing task for the specified data and obtaining the corresponding processing result comprise the step of arranging the obtained corresponding processing result into an index and storing as information data related to technology transfer, wherein the processing result is directly called.

Figure 7:
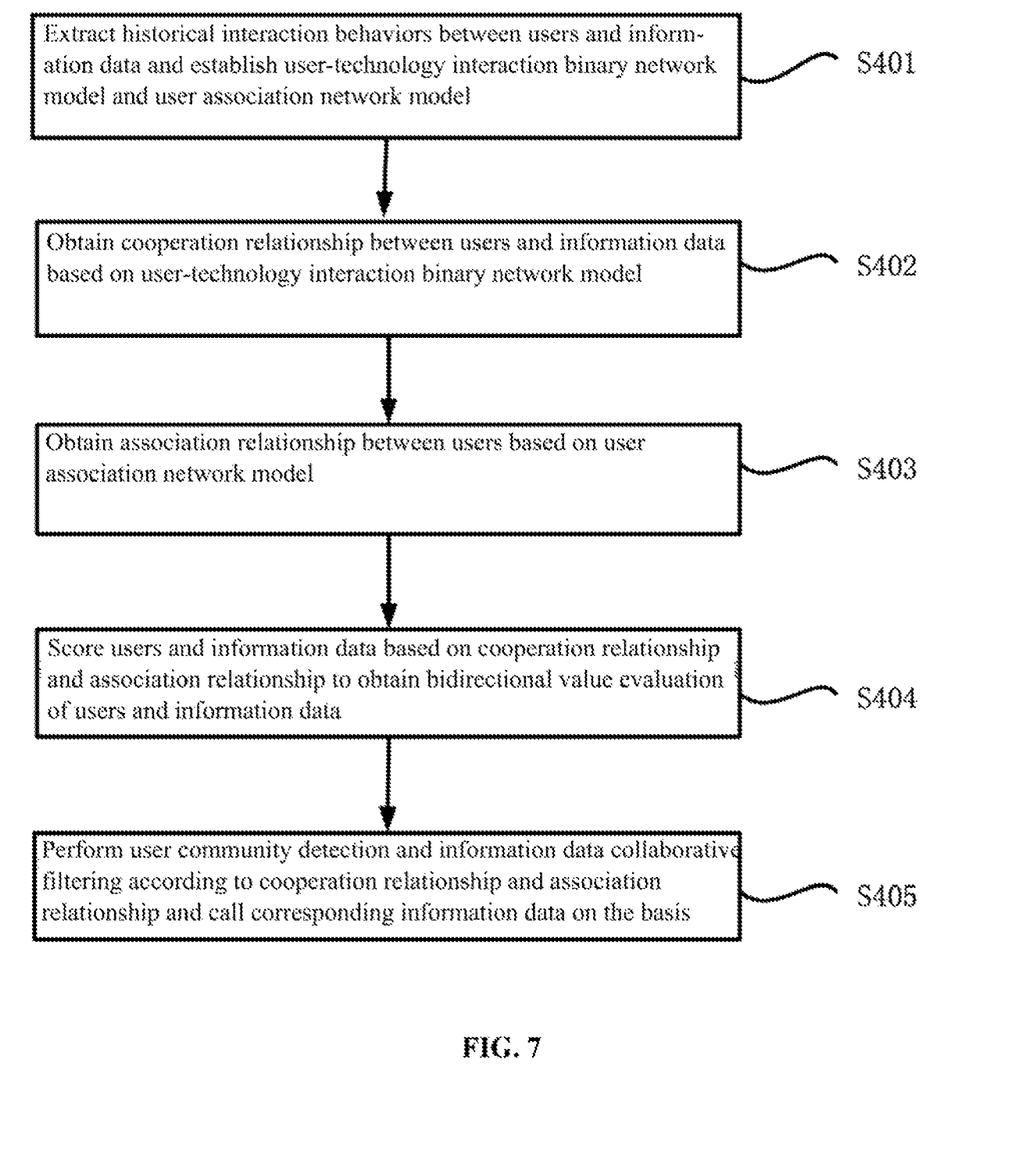
FIG. 7 shows the workflow for calling information data in one preferred embodiment of the present invention.

In the embodiment as shown in FIG. 7, preferably, the working process of the bidirectional value evaluation model comprises the following steps:

S401, extracting historical interaction behaviors between the users and the information data, and establishing the user-technology interaction binary network model and the user association network model;

S402, obtaining the cooperation relationship between the users and the information data based on the user-technology interaction binary network model;

S403, obtaining the association relationship between the users based on the user association network model; and S404, scoring the users and the information data based on the cooperation relationship and the association relationship to obtain bidirectional value evaluation of the users and the information data;

In the embodiment, preferably, the method can also comprise the following steps:

S405, performing user community detection and information data collaborative filtering according to the cooperation relationship and the association relationship, and calling corresponding information data on this basis.

In the embodiment, preferably, the user associated credit score can be obtained by predicating through the graph volume integral network.

In the embodiment, preferably, the basic credit score of the users and the information data is obtained by predicating through a logistic regression model;

In the embodiment, preferably, a linear regression model is used for taking the obtained basic credit score of the users and the information data and the user associated credit score as input of the logistic regression model, and outputting to obtain a comprehensive credit score of the users and the information data.

In the embodiment, preferably, the technology innovation evaluation model adopts the character recognition method to carry out picture recognition on the technology literature in the related technical field, performs character clustering on the recognized characters to obtain pictures to be used for comparison, compares the to-be-evaluated technology keywords with characters in the picture to be used for comparison, and judges that the technology innovation is insufficient if the same rate of the to-be-evaluated technology keywords and the characters in the picture to be used for comparison is greater than a judgment threshold value.

In the embodiment, preferably, the method can also comprise the following step of updating corresponding information data related to technology transfer according to the user operation instruction.

In some embodiments of the present invention, a technology for analyzing and mining basic information of patent literature is provided. The data structures of the patent literature are deconstructed by defining the data form and content boundary of the basic information of the patent literature. For structured patent metadata, a multi-angle quantitative statistical analysis method set is provided. For unstructured patent text data, a patent text mining process from text data modeling, feature representation, feature filtering and SAO-based keyword analysis is provided.

In some embodiments of the present invention, a patent complex network modeling and analysis technology using potential association relationships in patent data is provided. A patent EPC co-occurrence network, a citation network and a keyword network are constructed by extracting the IPC co-occurrence relationship, citation/citation relationship and SAO-based keyword association relationship of the patent. On the basis of completing network index statistics, information in the patent complex network is mined by using main path analysis and heterogeneous information network analysis methods.

In some embodiments of the present invention, the analysis of the basic information of the patent literature takes the most initial patent data as an object, that is, the stored patent literature and patent literature metadata are called, related calculation tasks are executed according to the analysis requirements of the users, the result is updated and stored, and the corresponding data is returned to a front-end display part for rendering when there is a call demand. The analysis mainly includes global data update involving the whole data and OLAP analysis responding to specific analysis scenes of the users, the former is for data expansion optimization for a single patent literature, and the latter is for statistical analysis of the patent data extracted under a specific filtering condition and generation of an analysis report.

In some embodiments of the present invention, patent network modeling and analysis are aimed at various association relationships contained in the patent data. The design of the system includes the patent citation network model constructed by the patent citation relationship, the IPC co-occurrence network model constructed by the patent IPC classification co-occurrence relationship, and the keyword network model constructed based on SAO text mining. The modeling of the first two parts is based on the storage of the patent literature metadata and is carried out by using citation relationship items and IPC classification items in the patent metadata, and the keyword network is constructed based on the storage of the patent literature and is constructed by completing technology association network construction in a patent text through natural language processing and executing heterogeneous information network transformation. Since graph calculation itself consumes huge calculation resources, the citation network analysis and the IPC co-occurrence analysis both adopt preset, periodic calculation is performed on the data granularity level based on IPC classification, and the result is presented on a patent detail page. Keyword network analysis is completed in one time when patent literature is imported into the system, and calculation is no longer performed under the condition that the patent original text is not changed.

Some embodiments of the present invention further comprise the bidirectional value evaluation model, the technology innovation evaluation model and the data query model. The bidirectional value evaluation model constructs the user-technology interaction binary network model and the user association network model by utilizing the historical interaction behaviors between the users and the information data, wherein the cooperation relationship between the users and the information data is obtained based on the user-technology interaction binary network model, the association relationship between the users is obtained based on the user association network model, and the users and the information data are scored based on the cooperation relationship and the association relationship so as to obtain the bidirectional value evaluation of the users and the information data; the technology innovation evaluation model obtains the technology information in the technology literature based on the character recognition method, compares the technology information with to-be-evaluated technology keywords and gives corresponding innovation evaluation according to the comparison result; and the data query model directly queries required information data based on the data search engine.

In some embodiments of the present invention, the technology innovation evaluation model adopts the character recognition method to carry out picture recognition on the technology literature in the related technical field to obtain recognized characters (characters of technology information), performs character clustering on the recognized characters to obtain pictures to be used for comparison, compares the to-be-evaluated technology keywords with characters in the picture to be used for comparison, and judges that the technology innovation is insufficient if the same rate of the to-be-evaluated technology keywords and the characters in the picture to be used for comparison is greater than a judgment threshold value.

In some embodiments of the present invention, the bidirectional value evaluation model can predict to obtain the user associated credit score by using the graph volume integral network; the basic credit score of the users and the information data can be obtained by predicating through the logistic regression model; and the linear regression model can be used for taking the obtained basic credit score of the users and the information data and the user associated credit score as input of the logistic regression model, and outputting to obtain a comprehensive credit score of the users and the information data.

In some embodiments of the present invention, the patent value evaluation model based on deep learning is provided to solve the problem that most existing effect concept graph matching methods have poor matching fault tolerance. A novel method for mining a corresponding relationship between a patent and an effect is proposed from the perspective of big data. A Long Short Term Memory (LSTM) network and a bidirectional LSTM based on attention are combined to form a model training patent corpus, and classification is performed through a Softmax classification model to obtain an effect of the patent. According to the method, a Bi-LSTM-ATT model is used for training, so that certain availability is achieved for judging the effect of the patent, and the accuracy can reach 70% or above.

In some embodiments of the present invention, the feature data extraction method based on the time sequence is adopted, and the feature data extraction method is a feature data optimization extraction simulation method in a big data environment. The method performs optimization extraction on the feature data in the big data environment and can effectively improve data quality in the big data environment. For the optimization extraction of the feature data, a density value near each data quality sample needs to be obtained, a sample aggregation area is given, and the optimization extraction of the feature data is completed. In a conventional method, an original transaction data set is established first, a data distribution rule is given, but the data sample aggregation area is not given, so that extraction precision is relatively low. The present invention provides the feature data optimization extraction method in the big data environment based on the time sequence. The method comprises the steps of identifying the time sequence of each data state quantity by utilizing the time sequence model, classifying the feature data in the time sequence, obtaining the density value near each data quality sample by adopting a high-density clustering method, giving the sample aggregation area, and introducing the label motion speed into the adaptive adjustment process of the sliding window to complete the optimization extraction of the feature data in the big data environment.

In some embodiments of the present invention, the fuzzy hierarchical clustering analysis and semantic similarity correlation based feature extraction method is adopted, and the method is a big data mining algorithm based on fuzzy hierarchical clustering analysis. In the text big data mining process, the big data mining precision is poor due to the influence of semantic fuzziness factors, so that the big data mining algorithm based on the fuzzy hierarchical clustering analysis and semantic similarity correlation based feature extraction is provided. According to the algorithm, a semantic concept tree is constructed by adopting generalized mapping, a binary semantic analysis method is combined to construct a big data distributed ontology model, a fuzzy hierarchical analysis method is adopted to judge the semantic similarity and the correlation of the big data, semantic association features of the big data information flow are extracted, a fuzzy mean algorithm is combined to carry out clustering analysis on the extracted feature quantities, an adaptive uniform traversal learning method is used for carrying out information fusion processing on the association feature quantities in big data mining, an optimal solution of a mining objective function is obtained, and the big data optimization mining is achieved. The algorithm is good in semantic directivity and excellent in data focusing performance, the recall ratio and the precision ratio of the data mining are increased, and the overall performance is stable and reliable.

In some embodiments of the present invention, the character string fuzzy matching method based on the filtering technology is adopted to solve the problem of low searching efficiency of a character string fuzzy matching method based on an editing distance by analyzing a character string fuzzy matching process and optimizing the character string fuzzy matching process with a large data volume by using a parallelization technology. Meanwhile, an algorithm for calculating the editing distance between character strings has low performance, so that an improved method for filtering a character string set to be searched by using a character string filtering rule and then performing fuzzy matching is provided.

In some embodiments of the present invention, a user-technology interaction analysis technology based on group intelligence is provided, the user-technology interaction binary network is modeled on the basis of abstract extraction of interaction behaviors between users and patents, and the user association network is modeled. Based on the two networks, community detection and patent collaborative filtering of patent collaborative analysis users are finished, and meanwhile, the bidirectional value evaluation of the user-technology evaluation binary network is realized.

Another embodiment of the present invention provides a terminal. The terminal comprises a memory, a processor and a computer program which is stored in the memory and can be run on the processor, wherein the processor can be used for executing any one method in the embodiment of the present invention when executing the program.

In the embodiment, preferably, the information data are stored in a local memory or a cloud.

Optionally, the memory is used for storing the program; the memory comprises a volatile memory such as a random-access memory (RAM), a static random-access memory (SRAM), a double data rate synchronous dynamic random access memory (DDR SDRAM); and the memory can also comprise a non-volatile memory, such as a flash memory. The memory is used for storing the computer program (such as an application program, a functional module and the like for implementing the method), computer instructions and the like, and the computer program, the computer instructions and the like can be stored in one or more memories in a partitioned manner. The computer program, the computer instructions, the data and the like can be called by the processor.

The computer program, the computer instructions, and the like can be stored in one or more memories in a partitioned manner. The computer program, the computer instructions, the data and the like can be called by the processor.

The processor is used for executing the computer program stored in the memory to implement each step in the method related to the embodiment. The specific description can be seen in the abovementioned method embodiments.

The processor and the memory can be independent structures and can also be integrated structures. When the processor and the memory are independent structures, the memory and the processor can be coupled and connected through a bus.

The third embodiment of the present invention provides the computer readable storage medium which is used for storing the computer program, and the program is used for executing any method in the embodiment of the present invention when being executed by the processor.

The general information interaction method and system of the technology transfer office, and the terminal provided by the embodiment of the present invention collect patent information from the patent literature, and perform processing, sorting and analysis to form patent competition information through so as to serve scientific and technological development strategies of enterprises, which is called patent information analysis. The advantages are that isolated information are transformed into valuable patent competition information from common information according to different aggregation degrees through analysis, and the key technologies and technology development directions of enterprises or countries in related industries and technical fields, and the technology combinations and technology investment trends of main competitors can be judged from a special perspective of patents according to the information, thereby formulating patent strategies matched with overall development strategies for the enterprises.

The general information interaction method and system of the technology transfer office, and the terminal provided by the embodiment of the present invention perform intellectual property value evaluation through current intellectual property production value and future effects.

The general information interaction method of the technology transfer office, the terminal and the medium provided by the embodiment of the present invention realize multi-dimensional and visual big data analysis, and the analysis comprises but is not limited to:

trend analysis: discovering the new field worthy of entering according to the patent number, patent litigation/transaction and other trends of different technical fields in recent years;

citation analysis: automatically generating the citation analysis map of the technology, and finding the technology source and the key nodes in the development process;

geographic analysis: verifying the possibility of entering a potential market according to patent distribution of different regions;

technology analysis: presenting the full view of current technology distribution in the industry, displaying the technical strength field of competitors, and providing reference for research and development; and litigation risk analysis: filtering legal information such as high-value patents, litigation history and permission in the industry by one key and establishing the early warning mechanism in advance.

The general information interaction method and system of the technology transfer office, and the terminal provided by the embodiment of the present invention realize retrieval, viewing, evaluation and batch analysis of patents by patent analysis users, and realize the patent directional recommendation of the patent analysis users, global regular calculation and updating of patent data and continuous extraction and analysis of related data of the patent users and the patents.

With the adoption of the general information interaction method and system of the technology transfer office, and the terminal provided by the present invention, the practical and effective reference values can be provided for the methods for improving the commercialization success rate, objectively evaluating and shunting corresponding technologies, efficiently investing related patents, researching, developing and marketing, avoiding high-cost investment of bad technical assets, identifying and preventing unpredictable problems of risks exposed in the commercialization process and the like.

Those skilled in the art know that, besides implementing the system and all devices thereof provided by the present invention in a purely computer readable program code manner, the system and all devices thereof provided by the present invention can also completely realize the same functions in the forms of a logic gate, a switch, a special integrated circuit, a programmable logic controller, an embedded microcontroller and the like by carrying out logic programming on the method steps. Therefore, the system and all devices thereof provided by the present invention can be regarded as a hardware component, and the device for realizing various functions included in the system can be regarded as a structure in the hardware component; and the device for realizing various functions can also be regarded as a software module for realizing the method and a structure in the hardware component.

The specific embodiments of the present invention are described above. It should be understood that the present invention is not limited to the above specific embodiments, and those skilled in the art can make various deformations or modifications within the scope of the claims, which does not affect the essence of the present invention.

We claim:

1. A method for data processing and interactive information exchange, comprising:
   (1) obtaining an operation instruction from a plurality of users;
   (2) forming a data processing instruction based on the operation instruction and obtaining information related to technology transfer based on the data processing instruction, wherein the step (2) further comprises:
   obtaining patent information in patent literature to form patent competition information,
   obtaining a numerical quantity of patents, a numerical quantity of patent litigations, and a numerical quantity of patent transactions in different technical fields from a set time period to form patent trend information and discovering a new field to enter,
   obtaining patent citation information for generating a citation analysis map of a technology and obtaining a technology source and key nodes in a development process, obtaining patent distribution conditions of different regions and verifying a possibility of entering a potential market, obtaining current technology distribution conditions in an industry and displaying technical fields of competitors to provide a reference for research and development, extracting patents in the industry and corresponding legal information and establishing an early warning mechanism for litigation risks, obtaining a current intellectual property production value and future effects of an intellectual property, obtaining information on interaction between the users and the technology and between the users for carrying out a bidirectional scoring based on a cooperation relation between the users and the technology and an association relation between the users, obtaining technical information in technology literature in a related technical field based on technology keywords for carrying out a preliminary innovation evaluation, and obtaining information required by the users according to search requests from the users;

(3) performing data processing on the information related to technology transfer from step (2) to obtain specified data required by the operation instruction, wherein the step (3) further comprises:

obtaining feature data on the information related to technology transfer, extracting features from the feature data to obtain extracted features by a time sequence based feature extraction method, a fuzzy hierarchical clustering analysis and semantic similarity correlation based feature extraction method, or both, wherein the time sequence based feature extraction method further comprises the steps of identifying a time sequence of a stated quantity of preliminary feature data by utilizing a time sequence model, classifying the preliminary feature data in the time sequence, obtaining a density value near a sample of the preliminary feature data by adopting a density clustering method and giving a sample aggregation area, and introducing a label motion speed into the sample aggregation area so that a sliding window of the sample aggregation area is adaptively adjusted to complete the extraction of the preliminary feature data to obtain the extracted features, and wherein the fuzzy hierarchical clustering analysis and semantic similarity correlation based feature extraction method further comprises the steps of performing data integration of a distributed data ontology on the feature data to obtain an integrated feature data, performing a semantic similarity and correlation judgment on the integrated feature data and extracting semantic correlation features of a flow of the feature data, performing a clustering analysis on the extracted semantic correlation features, performing an information fusion of the semantic correlation features, and solving a solution of a feature extraction objective function to realize feature extraction and obtain the extracted features, and filtering the extracted features to obtain the specified data; and (4) running a processing task on the specified data to obtain a processing result, wherein the step (4) further comprises generating the citation analysis map of the technology based on the patent citation information and obtaining the technology source and key nodes in the development process, performing statistical analysis on information in a patent association network based on a patent international classification co-occurrence relationship and obtaining one or more of a trend analysis, a regional analysis, a technology analysis, and a litigation risk analysis, obtaining the patent information in the patent literature based on a subject-action-object (SAO) text mining and forming the patent competition information, establishing a corresponding relationship between the current intellectual property production value and the future effects of the intellectual property based on a deep learning method and obtaining a corresponding value evaluation, performing the bidirectional scoring by constructing a user-technology interaction binary network model and a user association network model, utilizing historical interaction behaviors between the users and the technology, obtaining the cooperation relation between the users and the technology; obtaining the association relation between the users; and scoring the users and the information on the interaction between the users and the technology and between the users based on the cooperation relation and the association relation to obtain the bidirectional score of the users and the technology, and performing user community detection and information collaborative filtering according to the cooperation relation and the association relation, carrying out character recognition and picture recognition on the technology literature in the related technical field to obtain recognized characters, performing character clustering on the recognized characters to obtain a picture to be used for comparison, comparing keywords in a to-be-evaluated technology with characters in the picture to be used for comparison, and judging that a technology innovation is insufficient based on a similarity rate of the keywords in the to-be-evaluated technology and the characters in the picture to be used for comparison is greater than a threshold value, and directly querying the information required by the users on a data search engine; and (5) interactively communicating the processing result to the users.

2. The method of claim 1, wherein the information related to technology transfer comprises:

patent literature and other technology literature;

patent metadata and other intellectual property information;

patent legal status;

project transformation information;

scientific and technological achievement information;

expert information;

expert scientific and technological achievement;

technical manager information;

related enterprise information; and other information set according to requirements.

3. The method of claim 1, wherein the step of filtering the extracted features to obtain the specified data further comprises a character string fuzzy matching method based on a filtering technology, and the character string fuzzy matching method comprises:

obtaining a to-be-matched target character string from the extracted features to form a character string set;

filtering the character string set by utilizing a regular expression; and performing fuzzy matching on the filtered character string set by adopting a parallel processing method to obtain the specified data.

4. The method of claim 1, wherein the step (4) further comprises:

arranging the processing result into an index.

5. The method of claim 1, further comprising:

updating the information related to technology transfer according to the operation instruction from the users.

* * * * *